United States Patent Office 3,452,090
Patented June 24, 1969

3,452,090
PREPARATION OF AROYL HALIDES
Irving L. Mador, Cincinnati, Ohio, and John A. Scheben, Erlanger, Ky., assignors to National Distillers and Chemical Corporation, New York, N.Y., a corporation of Virginia
No Drawing. Filed Oct. 15, 1965, Ser. No. 496,714
Int. Cl. C07c 51/58
U.S. Cl. 260—544                              10 Claims

ABSTRACT OF THE DISCLOSURE

A process for the production of aroyl halides in which an aryl halide is reacted with carbon monoxide in the presence of a platinum, palladium, ruthenium, rhodium, osmium, or iridium catalyst.

---

This invention relates to a process for the preparation of aroyl halides by reaction of aryl halides with carbon monoxide in the presence of a platinum or palladium triad catalyst, and, more particularly, to a process for the production of benzoyl bromide or chloride by reaction of bromobenzene or chlorobenzene under pressure of carbon monoxide in the presence of a catalytic amount of palladous bromide or chloride.

Bliss and Southworth, U.S. Patent No. 2,565,461, disclose the use of iron, nickel, or cobalt carbonyl, in conjunction with carbon monoxide, to convert aryl halides to aryl acids. The process is carried out in aqueous acid under severe conditions of temperature and pressure. Very substantial amounts of metal carbonyl are required.

In accordance with the instant invention, aroyl halides are prepared by the reaction of aryl halides with carbon monoxide in the presence of a platinum or palladium triad catalyst. The reaction proceeds at moderate temperatures in good yield. Unlike reactions involving other carbonyls, the platinum or palladium catalyst is not consumed in the course of the reaction, but can be recovered unchanged.

The reaction is applicable to any aromatic halide having at least one active halogen atom on an aromatic nucleus. The upper limit is established by the number of substitutable hydrogens on the aromatic nucleus or nuclei. Aroylation of each active halogen present in the aromatic nucleus will take place in the presence of stoichiometric quantities of carbon monoxide, so that a monohalide will give a mono-aroyl derivative, a dihalide a di-aroyl derivative, a trihalide a tri-aroyl derivative, and so forth, up to the total number of active halogens substituted for hydrogens in the aromatic ring. The active halogen substituent generally is bromine or chlorine. The fluorine and iodine substituents do not always react effectively, but in many cases they are sufficiently active to be used. Hence, the term "active halogen" is intended to include any halogen reactive under the reaction conditions to form an aroyl group. The aromatic compounds can be mono- or polynuclear, and the aromatic nuclei can be condensed, as in the case of naphthalene, phenanthrene, anthracene, pyrene, chrysene, triphenylene, pentacene, fluoranthene, and fluorene, or separate, as in diphenyl.

The process of the invention is applicable to aromatic compounds in which the nuclei are separate but connected by a bivalent bridging radical. Such polynuclear compounds normally have from two to ten nuclei, but there is no upper limit from the standpoint of operativeness. The bridging radical, which can be defined as Y, can be simply a carbon-to-carbon bond, as in the case of diphenyl, or an alkylene group having from one to ten carbon atoms, for instance, methylene, ethylene, propylene, butylene, hexylene, octylene, and decylene; as well as branched-chain radicals, for example, butylidene, propylidene, ethylidene; a cycloaliphatic bivalent radical, such as cyclohexylene, cyclohexylidene, cyclopentylene, and cyclopentylidene; or a bivalent arylene radical, such as phenylene; as well as other bivalent groups such as ether oxygen, ether sulfur, and mixed ether and sulfur alkylene and arylene groups, such as for example —CH$_2$CH$_2$—O—CH$_2$CH$_2$,

—CH$_2$CH$_2$—S—CH$_2$CH$_2$—

—O—CH$_2$CH$_2$—, —S—CH$_2$CH$_2$—, and the like. Others will be apparent to those skilled in the art from the above description.

In addition to the halogen groups, there can also be present one or more inert substituents that are not affected by the reaction, such as, for example alkyl groups, the alkyl having from about one to about twenty carbon atoms, for example, methyl, ethyl, propyl, t-butyl, isooctyl, decyl, octadecyl, and tetradecyl; mixed alkyl aryl groups, such as, for example, alkaryl groups having from seven to about thirty carbon atoms, for example, alphaphenethyl, benzyl, and beta-phenethyl; nitro groups; and ester groups in which the ester groups are attached to the aromatic nucleus through the carbon atom of the ester group or through the alcoholic oxygen atom of the ester group, the portion of the ester group not attached to the aromatic nucleus being attached to an aliphatic, aromatic, cycloaliphatic, or heterocyclic substituent, such as

—COOCH$_3$

—COOC$_6$H$_{11}$, —COOC$_2$H$_5$, —OOCCH$_3$, —OOC—C$_6$H$_5$, and —OOCC$_3$H$_7$.

Exemplary aromatic halides include monochlorobenzene, 1,2-, 1,3-, and 1,4-dichlorobenzene, p-chlorotoluene, p-chloro-o-xylene, 1,3,5-, 1,2,4-, and 1,3,4-trichlorobenzene, 2-chloromesitylene, p-chloroisooctylbenzene, 1,2,4,6-tetrachlorobenzene, hexachlorobenzene, bromobenzene, 1,2-, 1,3-, and 1,4-dibromobenzene, 1,2,4-, 1,3,5-, and 1,3,4-tribromobenzene, 1-chloro-4-nitrobenzene, alphachloronaphthalene, beta-chloronaphthalene, 2,2′,4,4′-tetrachloro-diphenylmethane, 4,4′ - butylidene - bis - 2,2′ - dichlorobenzene, 4,4′-cyclohexylidene-bis(2,2′-dichlorobenzene), fluorobenzene, 1,4-difluorobenzene, iodobenzene, 1,4-diiodobenzene, and alpha-fluoronaphthalene.

The reaction proceeds with any palladium or platinum triad catalyst, generically referred to in the claims as a platinum, palladium, ruthenium, rhodium, osmium, or iridium catalyst. The catalyst can be employed in the form of the salt, such as for example, the chloride, bromide, fluoride, iodide, nitrate, sulfate, or acetate; as the oxide; as the complex of the metal with an inorganic or organic complexing or a chelate-forming compound, such as the benzonitrile, the acetylacetonate, or the bis-π-aryl complex; or in the form of the metal, salt, oxide, or complex supported on an inert carrier, for example, carbon, alumina, or silica. Any of the platinum-palladium triad group metals can be employed, including platinum, palladium, ruthenium, rhodium, osmium, and iridium. The palladium catalysts are available and relatively inexpensive and give excellent results and, therefore, are preferred, particularly in the form of the halides, such as palladous chloride and palladous bromide. Other exemplary catalysts are palladium on carbon; palladous nitrate; palladous benzoate; platinous oxide; bis(benzonitrile) palladous chloride; the chlorides and bromides of rhodium, ruthenium, platinum, iridium, and osmium; platinous acetate rhodium oxide; palladous cyanide; rubidium carbonate; potassium chloropalladite; and palladous acetyl acetonate.

Compounds known to complex with the platinum-palladium triad group metals can also be added as cocatalysts. Examples of such ligands include triphenyl phosphine, pyridine, benzonitrile, and pentane-1,3-dione. Small amounts of such cocatalysts suffice to give an improved effect. Amounts within the range from about 10 to about 500 mole percent based on the catalyst are usually adequate.

The aromatic halides react with carbon monoxide in the presence of these catalysts in accordance with the following scheme:

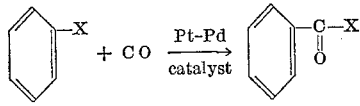

In this reaction, X represents halogen, such as chlorine, fluorine, bromine, or iodine, and as the aromatic nucleus, benzene is shown as illustrative. It will be understood that other aromatic nuclei can be substituted for benzene, in accordance with the preceding discussion.

It is apparent that since the reaction is stoichiometric, at least one mole of carbon monoxide must be supplied for each mole of the aromatic halide. It is usually convenient, however, to supply the carbon monoxide as the gas in considerable excess and under pressure. The pressure of carbon monoxide is not critical, and pressures of from about 1 to about 300 atmospheres can be utilized; however, the preferred pressure is within the range from about 70 to about 150 atmospheres.

The carbon monoxide can be bubbled through the reaction mixture, if desired. Normally, an adequate reaction is obtained if the carbon monoxide is supplied as an atmosphere under pressure above the reaction mixture and the reaction mixture stirred vigorously throughout the reaction.

The aromatic halide is preferably in the liquid phase to facilitate blending with the carbon monoxide. If the aromatic halide is itself a liquid, no reaction solvent is necessary. If the aromatic halide is a solid, it is preferred to employ an inert solvent as the reaction medium. The reaction mixture is preferably anhydrous, so that anhydrous solvents should be employed. A solvent may also be employed where the aromatic halide is a liquid.

Any inert organic solvent can be used, such as the aliphatic or aromatic hydrocarbons, ethers, phosphines, or chlorinated aliphatic hydrocarbon, such as, for example, mineral spirits, petroleum ethers, heptane, benzene, tetrahydrofuran, xylene, toluene, diethyl ether, dimethoxyethane, tributylphosphine, ethylchloride, 1,2-dichloroethane, and the like.

The amount of catalyst is in no way critical, and very small amounts are effective to bring about the reaction. In general, about 0.001 to about 20 molar percent, based upon the amount of aromatic halide employed, can be used. The preferred proportion is within the range from about 0.01 to about 2 molar percent. Two or more catalysts can be employed in admixture, if desired, with advantageous effect.

The reaction proceeds at temperatures within the range from about 20° C. to about 250° C. At temperatures below 20° C. the reaction rate may be unduly slow, but such temperatures can also be used, if desired. The upper temperature is normally established by the decomposition temperatures of the reactants and the reaction products. In some cases, at the higher reaction temperatures, polymeric by-products may be formed. The preferred reaction temperature is within the range from about 75° C. to about 200° C.

The catalyst is normally insoluble in the reaction mixture and must be maintained in uniform suspension therein during the reaction by stirring. At the conclusion of the reaction, the catalyst is conveniently separated, by centrifuging or filtration, and the liquid reaction mixture then worked up by fractional distillation. Any unreacted aryl halide and solvents can be removed and the higher boiling aroyl halide separated by distillation, desirably at reduced pressure, if it is high boiling.

The reaction is readily adapted to a continuous operation by blending catalyst and the aryl halide starting materials together with any unreacted material recovered from the previous step and leading the blend to the reactor, where it is put under pressure of carbon monoxide and held there for a time sufficient to effect the reaction. Conveniently, an elongated reactor can be used, in which the traverse time for the reaction mixture is equal to the required reaction time. The catalyst can then be separated by filtration or centrifugal separation, the solvent and unreacted aryl halide recovered by flash distillation, and the aroyl halide reaction product then purified in any desired manner.

The following examples in the opinion of the inventors represent preferred embodiments of their invention.

EXAMPLE 1

Palladous chloride, 3.55 grams (20 millimoles), and 127.1 grams (1.13 mole) of freshly distilled chlorobenzene were placed in the glass liner of a rocking autoclave. After sealing, the bomb was purged with nitrogen, and then carbon monoxide was added to a pressure of 1150 p.s.i.g. The bomb contents were heated to 160° C. and rocked at this temperature for thirty-two hours. At the end of this period, the excess pressure was vented and the system opened. The reaction mixture was filtered under a nitrogen atmosphere to give a precipitate containing palladium. Distillation of the filtrate after separation of chlorobenzene, gave benzoyl chloride, boiling point 196° to 198° C. Its identity was confirmed by conversion to the methyl ester and mass spectral analysis. Yield of benzoyl chloride, based on the amount of reacted chlorobenzene, was over 80%.

EXAMPLE 2

Palladous bromide (10 millimoles) and bromobenzene (0.73 mole) were heated at 160° C. for thirty hours in an autoclave as in Example 1, under an initial carbon monoxide pressure of 1200 p.s.i.g. Conversion of bromobenzene to benzoyl bromide boiling at 216° to 219° C. was obtained. Identification was made by vapor phase chromatography of the methyl ester derivative.

EXAMPLE 3

Platinum chloride, 1.038 grams (3.9 millimoles) and bromobenzene 68 grams (0.43 mole) were heated at 175° C. for eighteen hours in an autoclave as in Example 1, under an initial carbon monoxide pressure of 101 atmospheres. Benzoyl bromide was separated from catalyst and unreacted bromobenzene, converted with methanol to the methyl ester, and identified as such by vapor phase chromatography.

The process of this invention provides a useful synthesis for aroyl halides which are difficult to prepare by other methods. It is a relatively simple matter to obtain haloaromatic compounds with the halogen in any desired position, and such halogens are readily converted by this process to aroyl halides at that position in the instant reaction. Accordingly, the process is convenient not only for the preparation of known aroyl halides but also for the preparation of many aroyl halides of more esoteric structure that previously could not be prepared by conventional methods. All of the aroyl halides prepared in accordance with the invention are useful in the manner of known aroyl halides for the preparation of acids, esters, and like derivatives, undergoing the familiar reactions of aroyl halides as a class.

Having regard to the foregoing disclosure, the following is claimed as the inventive and patentable embodiments thereof:

1. A process for preparing aroyl halides from aryl halides, which comprises reacting an aryl halide with carbon monoxide at a temperature within the range of about 20 to about 250° C., but below the decomposition temperatures of the reactants and the reaction products in the presence of a platinum, palladium, ruthenium, rhodium, osmium, or iridium catalyst in an amount within the range from about 0.001 to about 20 molar percent based on the amount of the aryl halide to produce the corresponding aroyl halide.

2. A process in accordance with claim 1 in which the reaction temperature is within the range from about 75° to about 200° C. but below the temperature at which the reaction product is decomposed.

3. A process in accordance with claim 1 in which the carbon monoxide is applied at a pressure within the range from about 1 to about 300 atmospheres.

4. A process in accordance with claim 1 in which the aryl halide is a halobenzene.

5. A process in accordance with claim 4 in which the halobenzene is a monohalobenzene.

6. A process in accordance with claim 3 in which the halobenzene is a dihalobenzene.

7. A process in accordance with claim 3 in which the halobenzene is a trihalobenzene.

8. A process in accordance with claim 1 in which the reaction was carried out in the presence of an inert organic solvent.

9. A process in accordance with claim 1 in which the catalyst is a palladium halide.

10. A process in accordance with claim 1 in which the catalyst is a platinum halide.

References Cited

UNITED STATES PATENTS 2,565,461   8/1951   Bliss et al. _____ 260—544 XR

FOREIGN PATENTS 957,957   5/1964   Great Britain.
987,516   3/1965   Great Britain.

UNITED STATES PATENTS

Tsuji et al.: "Tetrahedron Letters," No. 50 (1965), pp. 4565–4568.

Bird: "Chem. Reviews," vol. 62 (1962), pp. 297–298.

LORRAINE A. WEINBERGER, *Primary Examiner.*

J. H. NIELSEN, *Assistant Examiner.*